(12) United States Patent
Shiu

(10) Patent No.: US 8,885,253 B2
(45) Date of Patent: Nov. 11, 2014

(54) PHASE GRATING WITH THREE-DIMENSIONAL CONFIGURATION

(71) Applicant: United Microelectronics Corp., Hsin-Chu (TW)

(72) Inventor: Jian-Bin Shiu, Hsinchu County (TW)

(73) Assignee: United Microelectronics Corp., Science-Based Industrial Park, Hsin-Chu (TW)

( * ) Notice: Subject to any disclaimer, the term of this patent is extended or adjusted under 35 U.S.C. 154(b) by 0 days.

(21) Appl. No.: 14/300,239

(22) Filed: Jun. 10, 2014

(65) Prior Publication Data

US 2014/0285894 A1 Sep. 25, 2014

Related U.S. Application Data

(60) Division of application No. 13/310,808, filed on Dec. 5, 2011, now Pat. No. 8,792,171, which is a continuation of application No. 12/255,642, filed on Oct. 21, 2008, now Pat. No. 8,092,699.

(51) Int. Cl.
 *G02B 5/18* (2006.01)
(52) U.S. Cl.
 CPC ...... *G02B 5/1971* (2013.01); *G02B 2005/1804* (2013.01)
 USPC .......................................................... 359/575
(58) Field of Classification Search
 USPC ................................................ 359/558–576
 See application file for complete search history.

(56) References Cited

U.S. PATENT DOCUMENTS

| | | | |
|---|---|---|---|
| 5,132,843 | A | 7/1992 | Aoyama et al. |
| 5,386,319 | A | 1/1995 | Whitney |
| 6,480,333 | B1 | 11/2002 | Maker |
| 6,524,772 | B1 | 2/2003 | Huang |
| 6,570,145 | B2 | 5/2003 | Huang |
| 8,092,699 | B2 | 1/2012 | Shiu |
| 2005/0264887 | A1 | 12/2005 | Sato |

FOREIGN PATENT DOCUMENTS

| | | | |
|---|---|---|---|
| TW | 488071 | B | 5/2002 |
| TW | 511150 | B | 11/2002 |
| TW | 548780 | B | 8/2003 |

OTHER PUBLICATIONS

Ioan Cosma, Tania Ristoiu and Simona Nicoara, "Physical Principles and Calculus of the Zone Grating Plate Antennas for Receiving Satellite TV-Signals", 0-7803-3879-0/98, May 1998.

H.D. Hristov, M.H.A.J. Herben, "Quarter-Wave Fresnel Zone Planar Lens and Antenna", IEEE Microwave and Guided Wave Letters, vol. 5, No. 8 Aug. 1995.

*Primary Examiner* — Stephone B Allen
*Assistant Examiner* — Tamara Y Washington
(74) *Attorney, Agent, or Firm* — Winston Hsu; Scott Margo

(57) ABSTRACT

A phase grating includes a substrate and a first dielectric layer. The first dielectric layer is disposed on the substrate and includes a column and a plurality of rings. The top sides of the column and the top sides of the rings align with one another to form a flat plane. The column and the rings are concentric.

10 Claims, 8 Drawing Sheets

PHASE GRATING WITH THREE-DIMENSIONAL CONFIGURATION

CROSS REFERENCE TO RELATED APPLICATIONS

This application is a divisional application of and claims the benefit of U.S. patent application Ser. No. 13/310,808, filed Dec. 5, 2011 and entitled "PHASE GRATING WITH THREE-DIMENSIONAL CONFIGURATION". patent application Ser. No. 13/310,808 is a continuation application of and claims the benefit of U.S. patent application Ser. No. 12/255,642, filed Oct. 21, 2008 and entitled "METHOD FOR FORMING PHASE GRATING". The entire contents of which are incorporated herein by reference.

BACKGROUND OF THE INVENTION

1. Field of the Invention

The present invention relates to a phase grating. In particular, the present invention relates to the phase grating with rings which have different heights.

2. Description of the Prior Art

Grating is an optical element made of periodical fine patterns. The patterns constituting the grating may be the change of transmittance, thickness or index of refraction. Among which, the grating made of change of thickness or index of refraction modulates the phase of the light to have diffraction. It is therefore called "phase grating".

The substrate for the grating is usually glass or plastics. The transmittance, thickness or index of refraction of the surface is then somehow changed. For example, fine patterns are engraved on the glass substrate by mechanical methods to obtain a reflective grating. Besides, most of the gratings made of plastics are thickness modulation type. First, a mother mold made of metal material is produced then the products are replicated therefrom. The problems of this method are, for example, difficult to control the cross section of the patterns and low yield.

For instance, the conventional Fresnel Lens is known to have the ability to focus without the disadvantages of traditional glass lens, such as heavy weight and bulky size. The Fresnel Lens per se may be composed of sheets made from polymeric materials with its surface engraved with multiple concentric circles. The angles and thickness of each circle is different so the Fresnel Lens is able to focus light.

First, U.S. Pat. No. 5,132,843 discloses a grating lens. Such grating lens is composed of a plurality of concentric circles formed on the surface. However, U.S. Pat. No. 5,132,843 does not disclose the substrate is made of what material or a plurality of concentric circles is formed by which methods on the substrate. Besides, U.S. Pat. No. 6,570,145 discloses another phase grating imaging sensor and the method for making the same. U.S. Pat. No. 6,570,145 discloses that a plurality of concentric circles is formed on a metal material, such as Cr, to obtain the phase grating imaging sensor. The aforesaid phase gratings are Fresnel Lens. The lens of such Fresnel Lens type phase gratings are of the same depth and disposed on the same surface. The focus capability of such planar gratings is not optimal. Accordingly, a phase grating of better focus capability is needed to overcome the problems which the Fresnel-Lens type phase grating encounters in the semiconductor field.

SUMMARY OF THE INVENTION

The present invention therefore proposes a Fresnel-Lens type phase grating of better focus capability. Such Fresnel-Lens type phase grating of the present invention which is disposed above an image sensor possesses excellent focus capability due to different depths of its lens and to the three-dimensional configuration. The phase grating of the present invention not only exhibits the advantage of the Fresnel-Lens but also avoids the disadvantages of the traditional complicated processes to form semiconductor optical elements, such as micro lens or color filters. In such way, the problems which the Fresnel-Lens type phase grating encounters in the semiconductor field are overcome. Still, the micro optical elements, such as the CMOS image sensor (CIS) in the semiconductor field may also utilize the vantage point of the Fresnel-Lens type phase grating well.

The first aspect of the present invention proposes a phase grating. The phase grating includes a substrate, a first dielectric layer and a second dielectric layer. The first dielectric layer has a recess with a tapered side on the substrate. The second dielectric layer is disposed on the recess with the tapered side and on the first dielectric layer and includes a column and a plurality of rings. The top sides of the column and the top sides of the rings align with one another to form a flat plane. The column and the rings are concentric and the rings are disposed on the tapered side of the recess so that the height of each ring is different.

In one embodiment of the present invention, the substrate includes an image sensor to correspond to the phase grating.

In another embodiment of the present invention, the first dielectric layer and the second dielectric layer have different etching selectivity.

In another embodiment of the present invention, the phase grating further includes an etching-stop layer disposed on the first dielectric layer.

In another embodiment of the present invention, the etching-stop layer may be nitride, oxide or oxynitride.

The second aspect of the present invention proposes another phase grating. The phase grating also includes a substrate, a first dielectric layer and a second dielectric layer. The first dielectric layer has a bulge with a tapered side on the substrate. The second dielectric layer disposed on the first dielectric layer and comprises a column and a plurality of rings. The top sides of the column and the top sides of the rings align with one another to form a flat plane. The column and the rings are concentric and the rings are disposed on the tapered side of the bulge so that the height of each ring is different.

In one embodiment of the present invention, the substrate includes an image sensor to correspond to the phase grating.

In another embodiment of the present invention, the first dielectric layer and the second dielectric layer have different etching selectivity.

In another embodiment of the present invention, the phase grating further includes an etching-stop layer disposed on said first dielectric layer.

In another embodiment of the present invention, the etching-stop layer may be nitride, oxide or oxynitride.

The third aspect of the present invention proposes another phase grating. The phase grating includes a substrate, a first dielectric layer and a plurality of annular trenches. The first dielectric layer is disposed on the substrate and includes a column and a plurality of rings. The top sides of the column and the top sides of the rings align with one another to form a flat plane. The column and the rings are concentric. A plurality of annular trenches are respectively sandwiched between the column and the rings so that the depths of any two annular trenches which are adjacent are different.

In one embodiment of the present invention, the substrate includes an image sensor to correspond to the phase grating.

In another embodiment of the present invention, the annular trenches respectively have different width.

In another embodiment of the present invention, the closer to the concentric center the smaller the width is.

In another embodiment of the present invention, the closer to the concentric center the greater the depth is.

The phase grating of the present invention possesses excellent optical properties and focus capability due to different depths of its lens and to the three-dimensional configuration. The phase grating of the present invention not only exhibits the advantage of the Fresnel -Lens but also avoids the disadvantages of the traditional complicated processes to form semiconductor optical elements, such as micro lens or color filters. In such way, the problems which the Fresnel-Lens type phase grating encounters in the semiconductor field are overcome.

These and other objectives of the present invention will no doubt become obvious to those of ordinary skill in the art after reading the following detailed description of the preferred embodiment that is illustrated in the various figures and drawings.

DETAILED DESCRIPTION

The gist of the present invention provides a method to practice various phase gratings to obtain a Fresnel-Lens type phase grating of better focus capability. Such Fresnel-Lens type phase grating of the present invention not only possesses excellent focus capability but also avoids the disadvantages of the traditional complicated processes to form semiconductor optical elements, such as micro lens or color filters, which is particularly suitable for the micro optical elements, such as the CMOS image sensor (CIS) in the semiconductor field.

Figure 1:
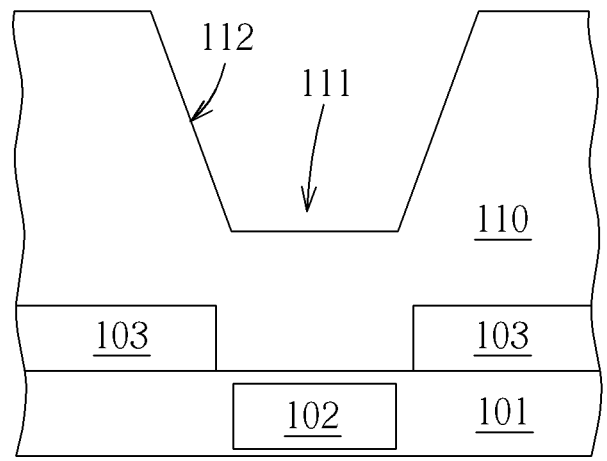
FIGS. 1-7 illustrate a preferred embodiment of the method for forming a phase grating of the present invention.
Figure 2:
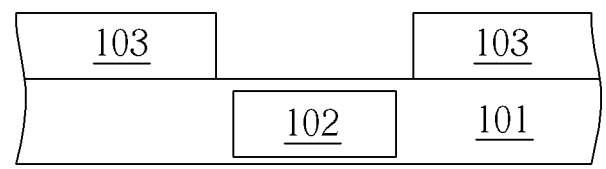

The present invention first provides a method for forming a phase grating. FIGS. 1-7 illustrate a preferred embodiment of the method for forming a phase grating of the present invention. As shown in FIG. 1, first a substrate 101 is provided. The substrate 101 may include Si. In addition, the substrate 101 further includes a micro optical element, such as an image sensor element 102. A first dielectric layer 110 is formed on the substrate 101, so that the first dielectric layer 110 has a recess 111 with a tapered side 112. For example, a first procedure to form the first dielectric layer 110 having a recess 111 with a tapered side 112 may be, as shown in FIG. 2, a patterned layer 103 is first formed on the substrate 101. Then, as shown in FIG. 1, a chemical vapor deposition, such as a high density plasma (HDP) is carried out so that the first dielectric layer 110 is formed. The resultant first dielectric layer 110 not only covers the patterned layer 103, but also forms a recess 111 with a tapered side 112. The structure of the recess 111 with the tapered side 112 of the first dielectric layer 110 is obtained with the help of the contour of the patterned layer 103 by adjusting the deposition/sputter ratio of the HDP chemical vapor deposition. Or alternatively, a second procedure to form the first dielectric layer 110 having a recess 111 with a tapered side 112 may be first forming the first dielectric layer 110 then carrying out a selective etching to obtain the first dielectric layer 110 having a recess 111 with a tapered side 112. The patterned layer 103 may include a metal or a nitride, such as silicon nitride. If the patterned layer 103 is composed of an opaque material, it may serve as the black matrix (BM) surrounding the image sensor element 102. The method to form the patterned layer 103 may be first blanket depositing a material layer on the substrate 101 then the needed patterned layer 103 is formed by lithography and etching.

Figure 3:
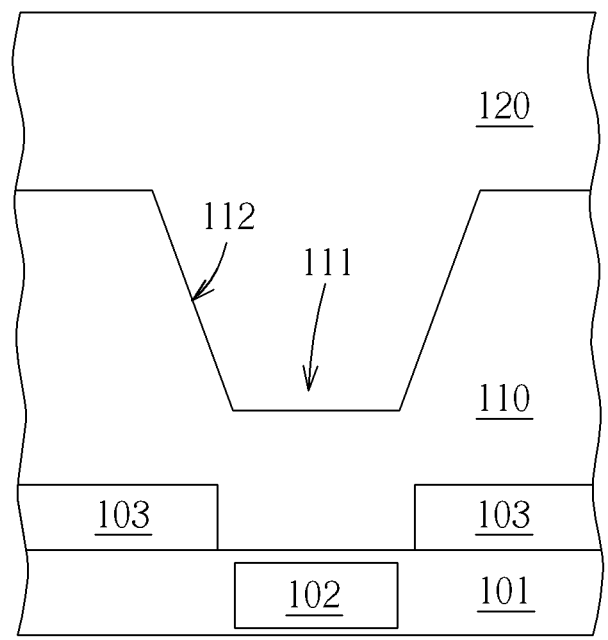

Second, as shown in FIG. 3, a second dielectric layer 120 is formed on the first dielectric layer 110. The second dielectric layer 120 fills the recess 111 with the tapered side 112 and covers the first dielectric layer 110. The tapered side 112 may have different slopes to deal with different optical applications, for example different colors such as red (R) , green (G) or blue (B) . The materials for the second dielectric layer 120 or for the first dielectric layer 110 may be the same or different. For example, materials of different etching selectivity, for example an oxide with a nitride, may be paired. The following is an example of materials of different etching selectivity.

Figure 4:
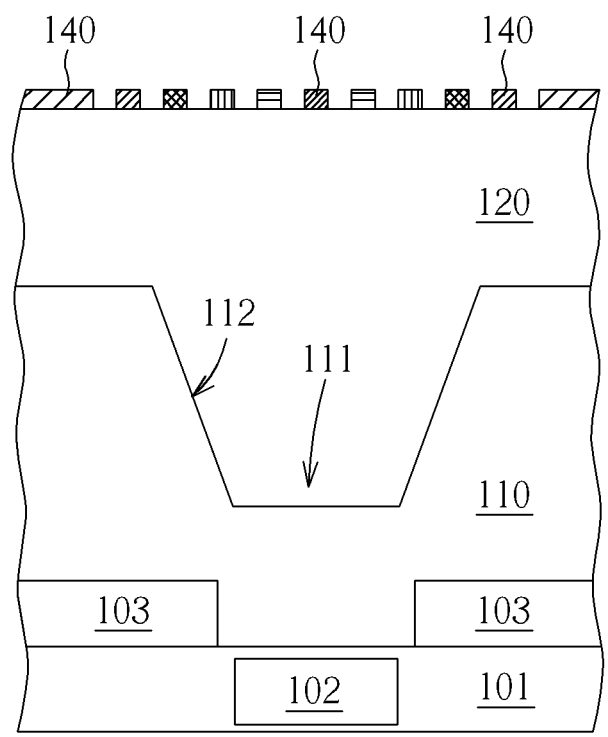
Figure 5:
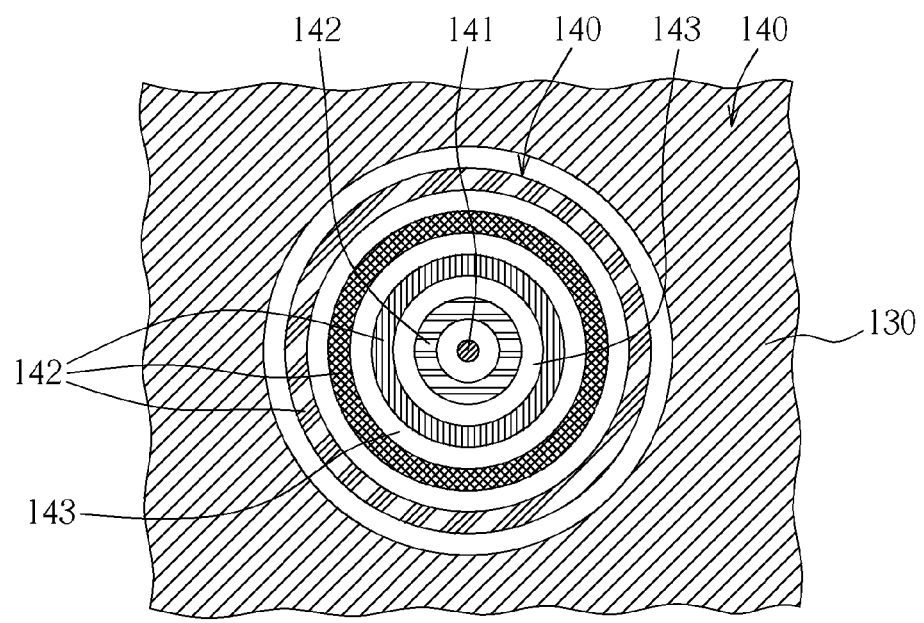
Figure 6:
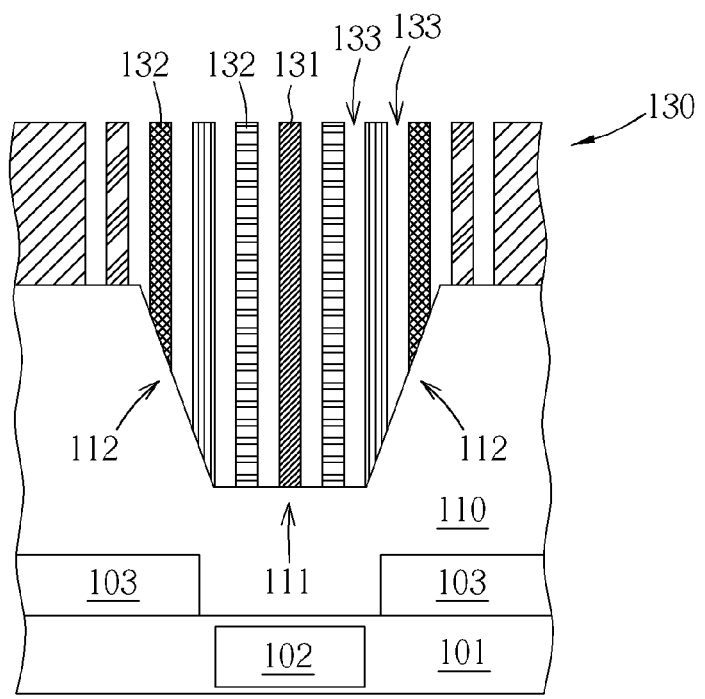

The second dielectric layer 120 is selectively etched to form the phase grating of Fresnel-Lens structure which is disposed above the image sensor element 102. The procedure to carry out the selective etching may be that, as shown in FIG. 4, first an auxiliary selective etching mask 140 is formed on the second dielectric layer 120 to facilitate the selective etching. FIG. 5 illustrates a top view of the selective etching mask 140 placed on the second dielectric layer 120 . The selective etching mask 140 is placed on the second dielectric layer 120 and includes a center circle 141, and a plurality of concentric rings 142 alternating with the grating zones 143 which are not covered by the selective etching mask 140. Later, the second dielectric layer 120 is etched, as shown in FIG. 6. Because the materials for the second dielectric layer 120 and for the first dielectric layer 110 have different etching selectivity, the second dielectric layer 120 is etched all the way to expose the recess 111 with the tapered side 112 of the first dielectric layer 110. Next, the selective etching mask 140 is removed and the phase grating 130 is obtained.

Figure 7:
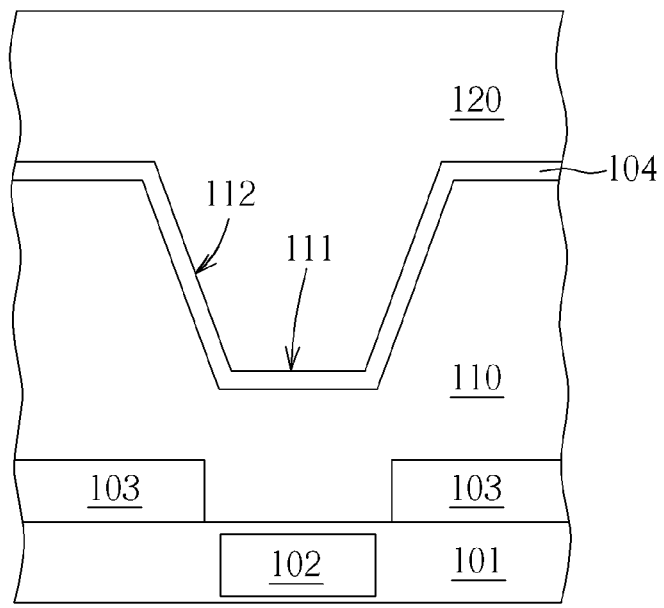

If the materials for the second dielectric layer 120 and for the first dielectric layer 110 have no etching selectivity, an etching-stop layer 104 is formed on the first dielectric layer 110 before the second dielectric layer 120 is formed, as shown in FIG. 7. The etching-stop layer 104 may be made of materials such as nitride, oxide or oxynitride as long as the etching-stop layer 104 and the second dielectric layer 120 have distinctive etching selectivity. If it is the case, the second dielectric layer 120 is etched all the way to expose the etching-stop layer 104 and to obtain the phase grating 130.

Please refer to FIG. 6. The phase grating 130 includes a column 131 and a plurality of rings 132 . The plurality of rings 132 alternate with the Fresnel grating zones 133. The width of the rings 132 or the width of the Fresnel grating zones 133 may be the same or different . The column 131 and the rings 132 are concentric. In addition, the rings 132 are disposed on the tapered side 112 of the recess 111 so that the height of each one of the rings 132 is different. This three-dimensional configuration results in the depths of each Fresnel grating zones 133 to be substantially different so the Fresnel-Lens type phase grating 130 of the present invention possesses excellent optical properties and focus capability. In such way, the phase grating 130 of the present invention not only exhibits the advantage of the Fresnel-Lens but also avoids the disadvantages, such as heavy weight and bulky size of the traditional complicated processes to form semiconductor optical elements, such as micro lens or color filters.

Figure 8:
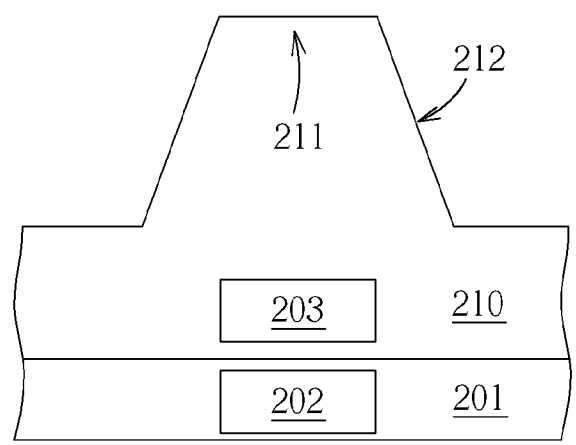
FIGS. 8-10 illustrate another preferred embodiment of the method for forming a phase grating of the present invention.
Figure 9:
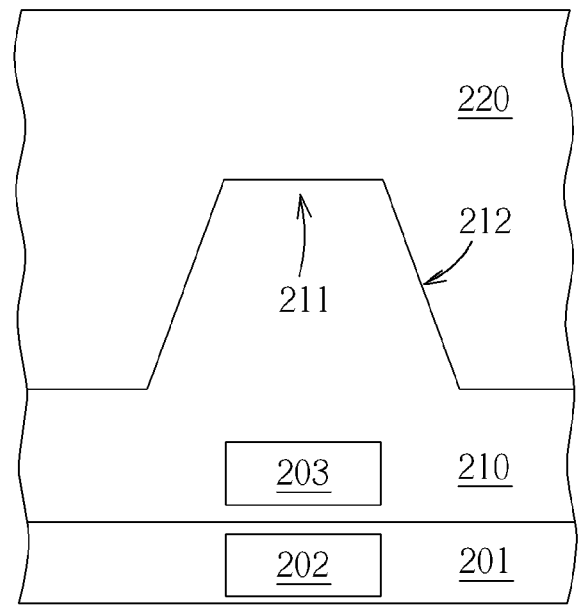
Figure 10:
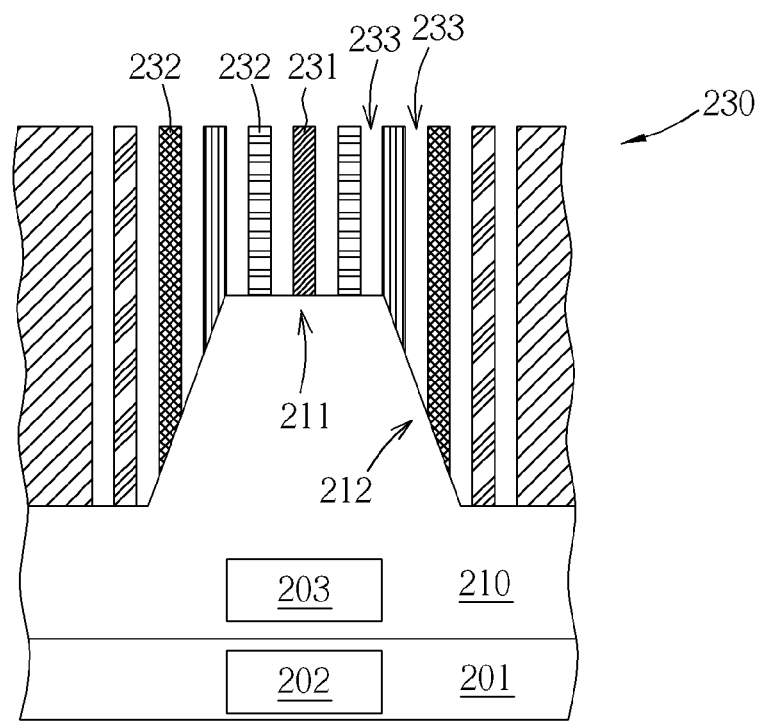

The present invention again provides another method for forming a phase grating. FIGS. 8-10 illustrate another preferred embodiment of the method for forming a phase grating of the present invention. As shown in FIG. 8, first a substrate 201 is provided. The substrate 201 may include Si. In addition, the substrate 201 further includes an image sensor element 202. A first dielectric layer 210 is formed on the substrate 201, so that the first dielectric layer 210 has a bulge 211 with a tapered side 212. For example, a first procedure of the present invention to form the first dielectric layer 210 may be that a patterned layer 203 is first formed on the substrate 201. Then, a chemical vapor deposition, such as a high density plasma is carried out and simultaneously adjusting the deposition/sputter ratio of the HDP chemical vapor deposition so the resultant first dielectric layer 210 not only covers the patterned layer 203, but also forms a structure of a bulge 211 with a tapered side 212 with the help of the contour of the patterned layer 203. Or alternatively, a second procedure to form the first dielectric layer 210 may be first forming the first dielectric layer 210 then carrying out a selective etching to obtain the first dielectric layer 210 having the bulge 211 with the tapered side 212.

Second, as shown in FIG. 9, a second dielectric layer 220 is formed on the first dielectric layer 210. The tapered side 212 may have different slopes to deal with different optical applications, for example different colors such as red (R), green (G) or blue (B). The materials for the second dielectric layer 220 or for the first dielectric layer 210 may be the same or different. For example, materials of different etching selectivity, for example an oxide with a nitride, may be paired. The following is an example of materials of different etching selectivity.

The second dielectric layer 220 is selectively etched until the first dielectric layer 210 having the bulge 211 with the tapered side 212 is exposed to form the phase grating which is disposed above the image sensor element 202. Please refer to the previous descriptions for the procedure to carry out the selective etching and the details will not be discussed here.

Please refer to FIG. 7. Similarly, if the materials for the second dielectric layer and for the first dielectric layer have no etching selectivity, an etching-stop layer is formed on the first dielectric layer before the second dielectric layer is formed. The etching-stop layer may be composed of materials such as nitride, oxide or oxynitride as long as the etching-stop layer and the second dielectric layer have etching selectivity. If it is the case, the second dielectric layer is etched all the way to expose the etching-stop layer and accordingly to obtain the phase grating.

Please refer to FIG. 10. The phase grating 230 includes a column 231 and a plurality of rings 232. The phase grating 230 is disposed above the corresponding image sensor element 202. The plurality of rings 232 alternate with the Fresnel grating zones 233. The width of the rings 232 or the width of the Fresnel grating zones 233 may be the same or different. The column 231 and the rings 232 are concentric. In addition, the rings 232 are disposed on the tapered side 212 of the bulge 211 so that the height of each one of the rings 232 is different. This three-dimensional configuration results in the depth of each Fresnel grating zones 233 to be substantially different so the Fresnel-Lens type phase grating 230 of the present invention possesses excellent optical properties and focus capability. In such way, the phase grating 230 of the present invention not only exhibits the advantage of the Fresnel-Lens but also avoids the disadvantages of the complicated processes to form semiconductor optical elements, such as micro lens or color filters.

Figure 11:
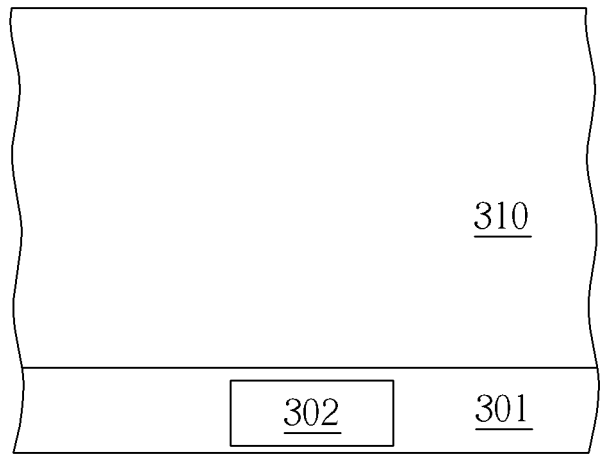
FIGS. 11-14 illustrate still another preferred embodiment of the method for forming a phase grating of the present invention.

The present invention still provides another method for forming a phase grating. FIGS. 11-14 illustrate still another preferred embodiment of the method for forming a phase grating of the present invention. As shown in FIG. 11, first a substrate 301 is provided. The substrate 301 may include Si. In addition, the substrate 301 further includes an image sensor element 302. A first dielectric layer 310 is formed on the substrate 301. For example, the procedure of the present invention to form the first dielectric layer 310 may be that a chemical vapor deposition is carried out to form the resultant first dielectric layer 310. Later, the first dielectric layer 310 is selectively etched to form a phase grating 330.

Figure 12:
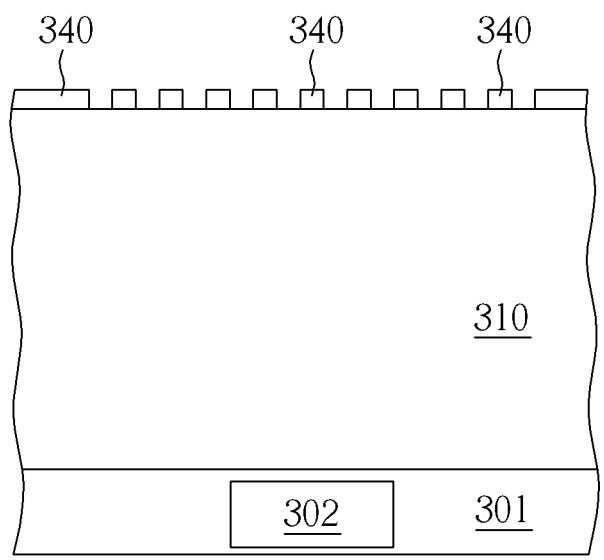
Figure 13:
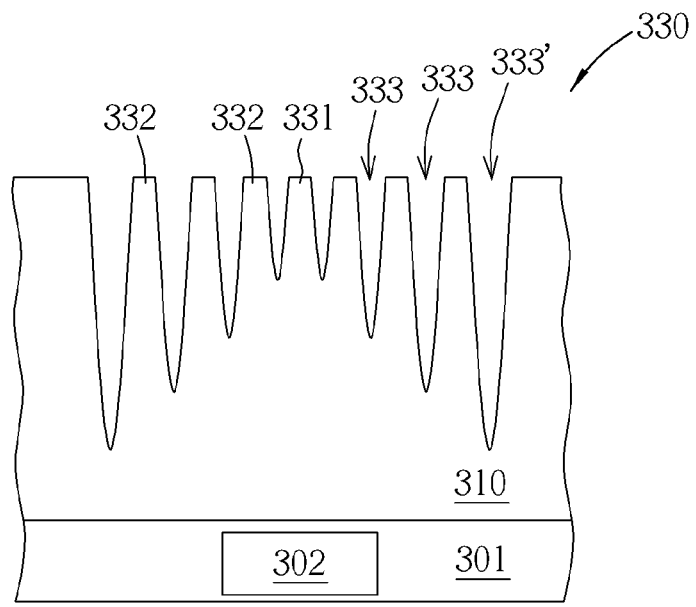

The procedure to carry out the selective etching may be that, as shown in FIG. 12, first a patterned mask 340 is formed on the first dielectric layer 310 to facilitate the selective etching. FIG. 13 illustrates a top view of the patterned mask 340 placed on the first dielectric layer 310. The patterned mask 340 is placed on the first dielectric layer 310 and includes a concentric center circle 341, and a plurality of concentric rings 342 alternating with the concentric grating zones 343 which are not covered by the patterned mask 340. The widths of the concentric grating zones 343 are different. Later, the first dielectric layer 310 is etched through the grating zones 343, as shown in FIG. 13. Optionally, the patterned mask 340 is removed after the selective etching of the first dielectric layer 310 is completed. Because different sizes of openings are susceptible to different etching strength under the same etching condition, for example in the presence of an isotropic etching, trenches of different depths are accordingly formed.

Please refer to FIG. 13. The phase grating 330 includes a column 331 and a plurality of rings 332. The phase grating 330 is disposed above the corresponding image sensor element 302. A plurality of rings 332 alternate with the Fresnel grating zones 333. The column 331 and the rings 332 are concentric. The widths of the rings 332 are usually the same. However, due to the different width of each of the grating zones 343, i.e. different area open to the etching, annular trenches 333' of different depths are therefore formed. Generally speaking, the larger the opening, i.e. the widths, the deeper the annular trenches are because of a stronger etching driving force. FIG. 13 illustrates that the closer to the concentric center, the shallower the annular trenches 333' are, i.e. the narrower the width of the annular trenches 333' are. Different slopes caused by different depths may have different optical applications, for example different colors such as red (R), green (G) or blue (B).

Figure 14:
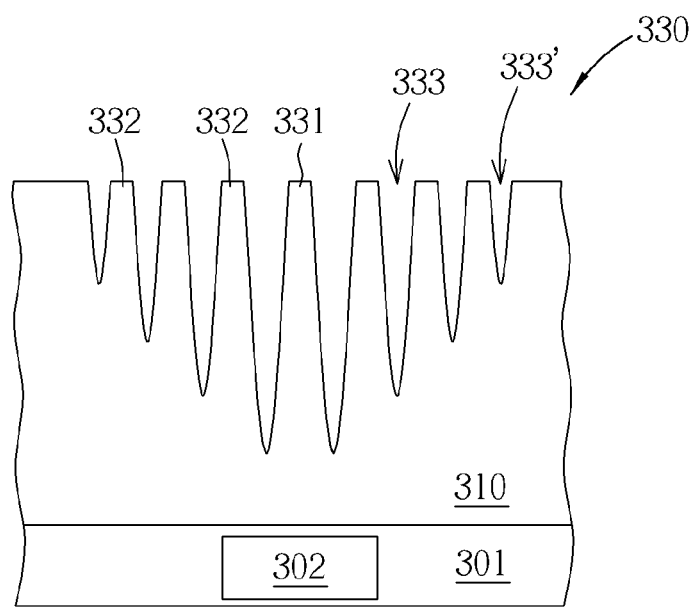

On the other hand, FIG. 14 illustrates that the closer to the concentric center, the deeper the annular trenches 333' are, i.e. the wider the widths of the annular trenches 333' are, which causes the annular trenches 333' have different depths. This three-dimensional configuration results in the Fresnel-Lens type phase grating of the present invention possesses excellent optical properties and focus capability. In such way, the phase grating of the present invention not only exhibits the advantage of the Fresnel-Lens but also avoids the disadvantages of the complicated processes to form semiconductor optical elements, such as micro lens or color filters.

Figure 15:
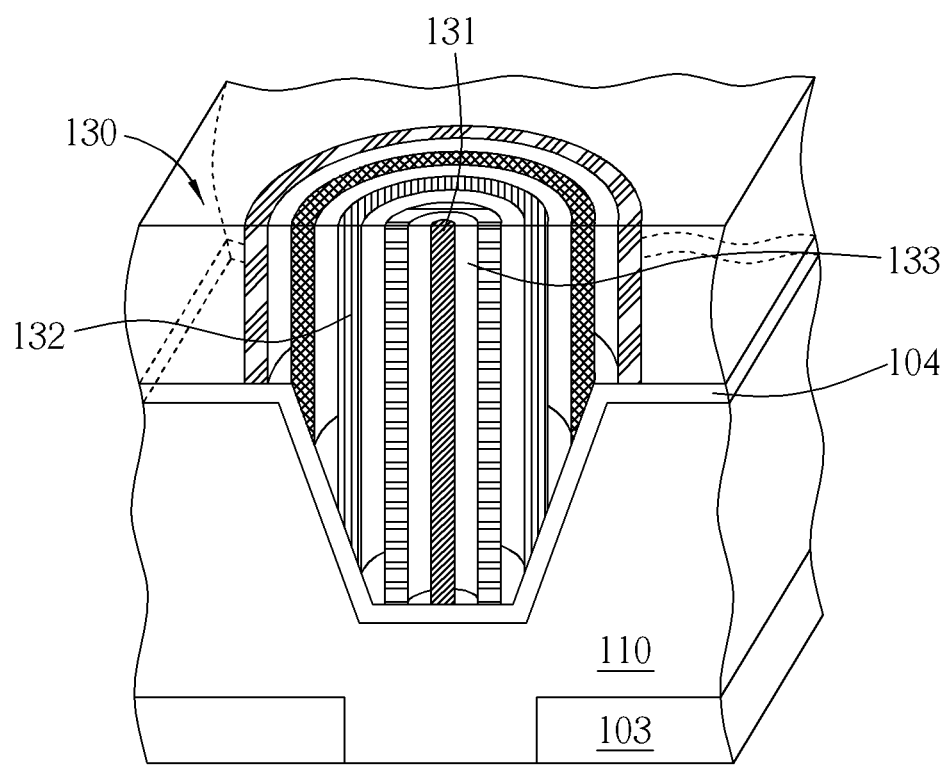
FIG. 15 illustrates a cross sectional view of the phase grating of the present invention.

The method of the present invention ingeniously employs the difference caused by the deposition/sputter ratio of the deposition operation of the semiconductor process, the difference of etching selectivity of different materials and the difference of etching strengths caused by different opening sizes. FIG. 15 illustrates a cross sectional view of the phase grating of the present invention. The phase grating 130 of the present invention can be easily and conveniently obtained by means of selective etching on the patterned layer 103 in the first dielectric layer 110. The phase grating 130 includes a column 131, a plurality of rings 132 and the Fresnel grating zones 133. The etching-stop layer 104 is also exposed. In such way, the problems which the Fresnel-Lens type phase grating encounters in the semiconductor field are overcome. Still, the micro optical elements, such as the CMOS image sensor (CIS) in the semiconductor field may also utilize the vantage point of the Fresnel-Lens type phase grating well.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A phase grating, comprising:
   a substrate;
   a first dielectric layer having a bulge with a tapered side on said substrate; and
   a second dielectric layer disposed on said first dielectric layer and comprising a column and a plurality of rings, wherein the top sides of said column and of said rings align with one another to form a flat plane, said column and said rings are concentric and said rings are disposed on said tapered side of said bulge so that the height of each said ring is different.

2. The phase grating of claim 1, wherein said substrate comprises an image sensor to correspond to said phase grating.

3. The phase grating of claim 1, wherein said first dielectric layer and said second dielectric layer has different etching selectivity.

4. The phase grating of claim 1, further comprising:
   an etching-stop layer disposed on said first dielectric layer.

5. The phase grating of claim 4, wherein said etching-stop layer is selected from the group consisting of nitride, oxide and oxynitride.

6. A phase grating, comprising:
   a substrate;
   a first dielectric layer disposed on said substrate and comprising a column and a plurality of rings, wherein the top sides of said column and of said rings align with one another to form a flat plane, said column and said rings are concentric; and
   a plurality of annular trenches respectively sandwiched between said column and said rings so that the depths of any two annular trenches which are adjacent are different.

7. The phase grating of claim 6, wherein said substrate comprises an image sensor to correspond to said phase grating.

8. The phase grating of claim 6, wherein said annular trenches respectively have different width.

9. The phase grating of claim 8, wherein the closer to the concentric center the smaller said width is.

10. The phase grating of claim 6, wherein the closer to the concentric center the greater said depth is.

* * * * *